Patented Dec. 6, 1932

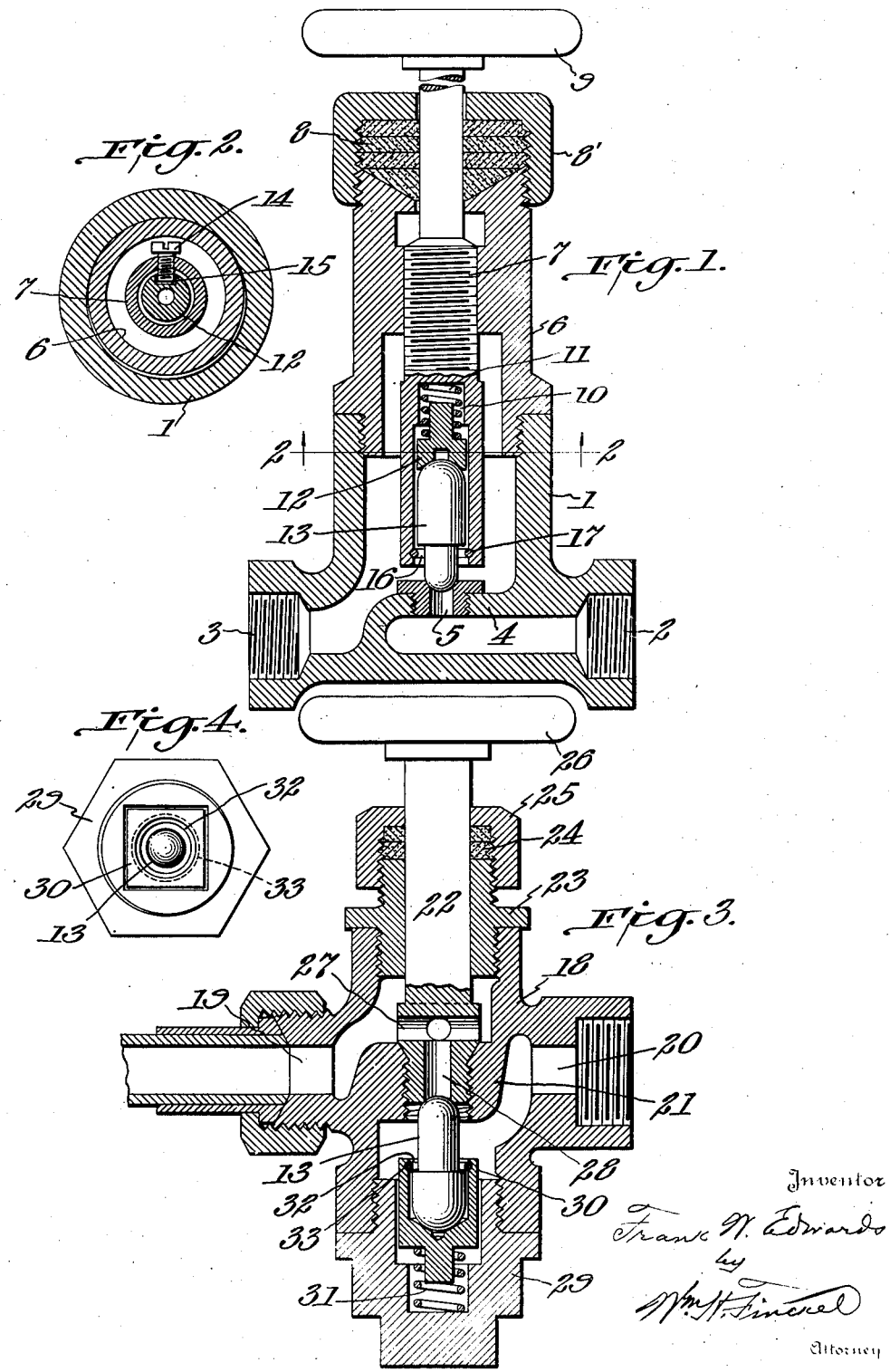

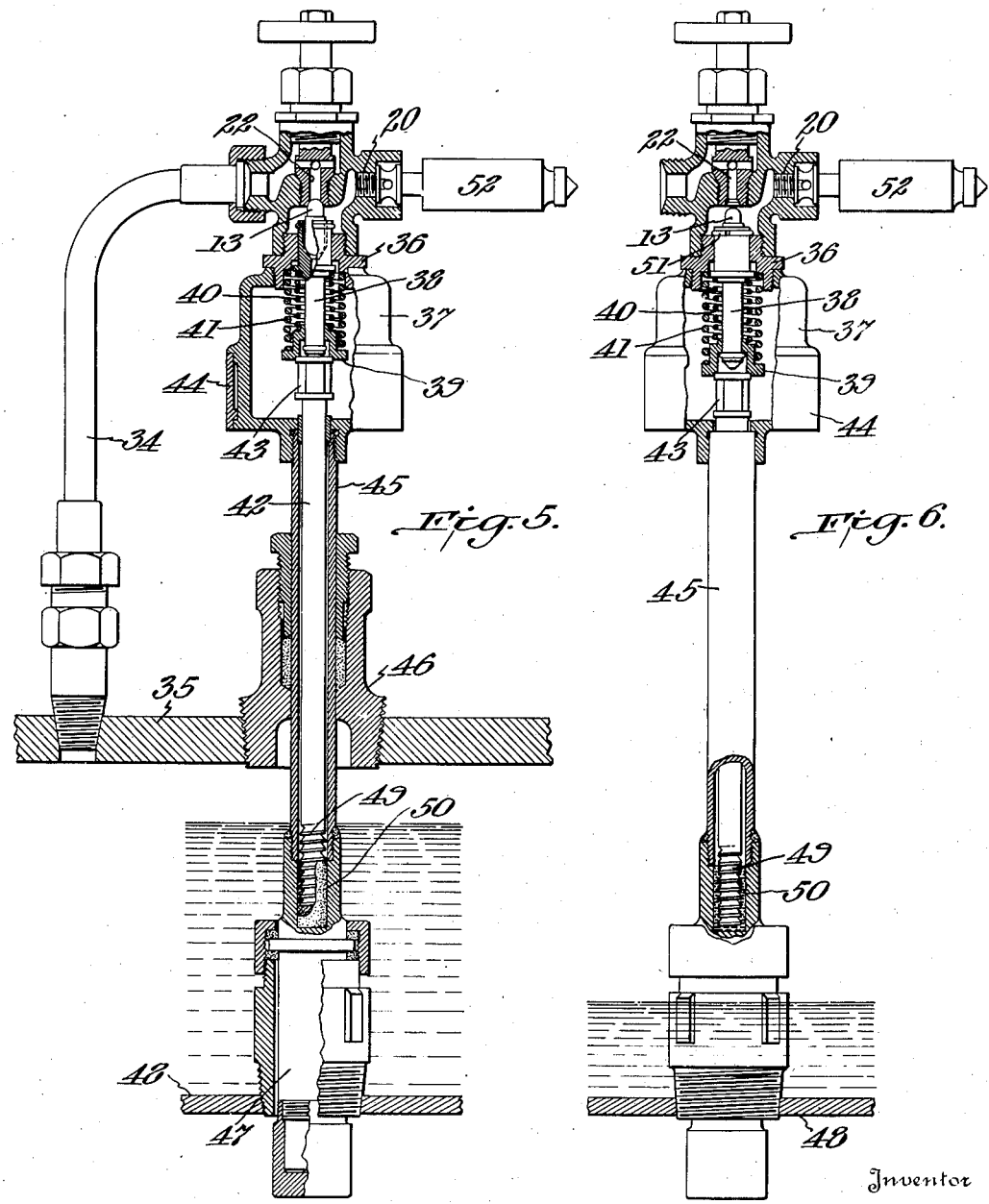

1,890,248

UNITED STATES PATENT OFFICE

FRANK W. EDWARDS, OF CHICAGO, ILLINOIS, ASSIGNOR TO THE OHIO INJECTOR COMPANY, OF CHICAGO, ILLINOIS, A CORPORATION OF ILLINOIS

HIGH PRESSURE SELF-GRINDING VALVE

Application filed July 2, 1926. Serial No. 120,173.

The object of this invention is to provide a high pressure, self-grinding valve, with a renewable and self-adjusting seat, for use in a variety of different machines or machinery, and more particularly in connection with a low water alarm.

The invention consists of a two-diameter valve member, of self-adjusting nature, mounted between a thrust bearing on its larger end and the valve seat on its smaller end, the two ends being described on arcs of circles so that in operation the valve will find its seat and be automatically ground to remove any inequalities and thereby ensure a pressure-tight seat and be readily renewable, as I will proceed now to explain and finally claim.

In the accompanying drawings illustrating the invention, in the several figures of which like parts are similarly designated, Figure 1 is a vertical section of one embodiment of the invention. Fig. 2 is a cross section on the line 2—2 of Fig. 1. Fig. 3 is a vertical section of another embodiment of the invention. Fig. 4 is a top plan view of a plug, the thrust bearing therein and the end of the valve, shown in Fig. 3, Figs. 2 and 4 showing different means for holding the thrust bearing against turning. Fig. 5 shows in vertical section and elevation an application of the valve to a low water alarm, the valve being closed, and Fig. 6 is a similar view showing the valve open.

Referring to Figs. 1 and 2, the body 1 is provided with the ports 2 and 3 which may be either inlet or outlet, the diaphragm 4 and the renewable ported valve seat 5. The bonnet 6 is screwed, or otherwise fitted to the top of the body and contains the screwthreaded stem 7 fitted therein by packing 8 and a cap nut 8', and having the operating handle 9.

The inner end of the stem is bored at 10 to receive a spring 11, and this bore is continued on a larger diameter to receive the thrust bearing 12 against the back of which the spring 11 presses. The face of the thrust bearing may be curved or angular, as desired.

13 is the plug-like two-diameter valve, having its larger diameter portion loosely fitted in the larger bore of the stem and its upper end curved on an arc of a circle and engaging the thrust bearing 12, and its lower end of smaller diameter, likewise curved, and adapted to engage the seat 5. The thrust bearing may be held from turning independently of the stem, and as one means to this end I have shown, in Fig. 2, a set-screw 14 mounted in the stem 7 and engaging a groove or recess 15 in the thrust bearing. The valve may be removably held in the stem in any suitable way, as by a spring ring 16 snapped into a groove 17 in the interior of the bore in the stem. By the use of the spring ring 16 the valve 13 is retained in place in such a way as to prevent its dropping out when the valve is dismantled and also ensuring the travel of the valve with the stem 7 when said stem is moved to open the valve.

The stem, thrust bearing and valve may be assembled outside of the valve body and then the assembled parts and the other parts put together.

The stem is screwed down toward the ported seat 5 and thereby through the valve 13 closes its port. If the center of the port in seat 5 does not line with the axial center of the valve stem, the valve 13, being loosely or flexibly mounted, will adjust itself to meet the difference, by angling and rotating a fractional part of an arc on the thrust bearing. The thrust bearing and its spring afford a resisting cushioning effect upon and flexibility to the valve. Each time the valve is opened, the valve member 13 may change its position with relation to seat 5, but each time it is closed the larger portion of valve member 13 having the greater area and contact seat, will have sufficient resistance to cause the valve member to rotate on seat 5 and thereby have a grinding action. This will tend to prolong the service life of the valve. In those valves in which the valve disk is swiveled to the stem and has a rigid bearing against the stem, there is a tendency to crush into the seat and cause damage, and this is avoided by my construction.

The construction shown in Figs. 3 and 4 is the same in principle as that shown in Figs. 1 and 2, but with the valve seat and thrust bearing reversely arranged. The body 18 has the ports 19 and 20 and an interposed diaphragm 21. The stem 22 is mounted in the bonnet 23, and supplied with the packing 24 and cap nut 25 and handle 26. The inner end of the stem is provided with the transverse ports 27 and the intersecting longitudinal port 28, and this ported end of the stem is screwed into the diaphragm. The end of the longitudinal port 28 is curved or angular to form the seat for the smaller diameter end of the valve 13. The bottom of the body 18 is closed by a plug 29, which is recessed to receive a pocket-like thrust bearing 30 and its supporting spring 31. As shown in Fig. 4, the thrust bearing may be held from turning in the plug 29, by making it with an angular periphery, or otherwise. This bearing 30 receives the larger diameter end of the valve 13, and a spring ring 32 is sprung into a groove 33 in the interior of the bearing above the valve to hold the valve within the bearing in a flexible but secure manner, especially when the valve is in full open position, and to prevent the valve from escaping from the bearing 30 when the valve is being dismantled.

The assembly of this valve may be made in separate parts and thus be ready for putting together.

The operation is substantially like that of the construction shown in Figs. 1 and 2.

The non-rotating feature of the thrust bearing, Figs. 2 and 4, in each construction is such as to permit the sliding movement of the thrust bearing.

Referring to Figs. 5 and 6, I have shown a valve substantially like that shown in Figs. 3 and 4, as applied to a low water alarm, in which the port 19 is connected with the boiler by a pipe 34 entering through the wrapper-sheet 35, and the plug 36 opens within a housing 37. This plug 36 serves as a guide for the valve pocket or cup and thrust bearing 38, shown partly in section in Fig. 5. The lower end of the bearing 38 is surrounded by a retainer 39 between which and the plug and thrust bearing 38 are interposed the expansion springs 40 and 41, which normally hold the valve 13 in closed position on the seat in the lower end of the valve stem 22.

The upper end of an operating rod 42 has an angular head 43 by which it may be turned when necessary, and this head and the upper end of the rod are enclosed within the housing 37, and the lower part of this housing is made with openings to gain access to the part 43 and these openings are covered and uncovered by a sleeve 44 mounted upon and adapted to be rotated about the housing.

The operating rod 42 is supported in a sleeve 45 mounted in a bushing 46 which is arranged steam-tight in the wrapper-sheet 35, the sleeve 45 extending into the boiler and connected with a thermal unit 47 mounted in the crown-sheet 48 of the boiler. The lower end of the rod 42 is threaded or burred at 49, and this threaded end held by means of a fusible medium 50 within the thermal unit 47 in such position as to hold the valve 13 to its seat as long as there is sufficient water in the boiler. When upon the lowering of the level of water in the boiler the thermal unit is exposed to the steam heat, the fusible medium 50 will melt and thus permit the rod 42 to drop and open the valve 13, all as shown in Fig. 6. At this time the rod is held from dropping unduly by the spring ring 51 engaging the top of the plug 36, as shown in Fig. 6.

When the danger of low water in the boiler is past, water is injected into the boiler, lowering the temperature, around the top of the thermal unit 47, causing the fusible medium 50 to harden about the screwthreaded end of rod 42. After this medium 50 is hardened, sleeve 44 may be moved from its closed position to an open position to permit a wrench to be applied to the head 43, unscrewing the rod 42 from the hardened medium 50, and closing the valve 13 against the seat at the lower end of part 22, thus shutting off escape of pressure through pipe 34.

A whistle or other audible alarm 52 is attached to the port 20, so that when the valve 13 is open, as in Fig. 6, the steam may pass through the valve ports and into the whistle and sound the same, thus giving the alarm.

The valve of this invention is of peculiar utility in a low water alarm, for the reason that it obviates past trouble of keeping the valve seated tight. This trouble or defect is due to the inaccuracies in machining the parts that make the complete assembly, but with this self-grinding and self-adjusting valve, the difficulty is overcome.

It will be understood that the springs 40 and 41 act under compression to hold the valve seated, as indicated in Fig. 5, and that when the rod 42 is freed from the support of the fusible material 50 when such material is fused, then the springs serve to act upon the retainer 39 and through it on the rod 42 to unseat the valve as shown in Fig. 6.

Variations in the details of construction and arrangement of parts are permissible within the principle of the invention and the scope of the claims following.

What I claim is:—

1. A valve of the character described, having a valve seat, and a plug-like valve having ends of different diameter, one end adapted to seat in said seat, and a thrust bearing acting upon the other end of the plug-like valve to hold the valve to its seat in a self-adjusting, flexible manner.

2. A valve of the character described, having a valve seat, a thrust bearing, and a plug-like valve having ends of different diameter engaging the valve seat and the thrust bearing at opposite ends, the thrust bearing being flexibly mounted and held against turning with the valve.

3. A valve of the character described, having a valve seat, a thrust bearing, a plug-like valve having ends of different diameter engaging the valve seat and the thrust bearing at opposite ends, the thrust bearing being flexibly mounted, means to hold the thrust bearing against turning with the valve, and a support for such means.

4. A valve of the character described, having a valve seat, a thrust bearing, a plug-like valve having ends of different diameter engaging the valve seat and the thrust bearing at opposite ends, the thrust bearing being flexibly mounted and held against turning with the valve, and means for opening and closing the valve.

5. A valve of the character described, having a valve seat, a thrust bearing, a plug-like valve engaging the valve seat and the thrust bearing at opposite ends, the thrust bearing being flexibly mounted, and means for opening and closing the valve, said means including a longitudinally adjustable stem within which the thrust bearing is mounted and movable with the stem in opening and closing the valve.

6. A valve of the character described, having a valve seat, a thrust bearing, a plug-like valve engaging the valve seat and the thrust bearing at opposite ends, the thrust bearing being flexibly mounted, and means to retain the valve in engagement with the thrust bearing.

7. A valve of the character described, having a valve seat, a thrust bearing, and a plug-like valve engaging the valve seat and the thrust bearing at opposite ends, the thrust bearing being flexibly mounted and having a retaining device to prevent the escape of the valve therefrom.

8. A valve of the character described, having a valve seat, and a plug-like valve having its opposite ends of different diameter and curved, the seat being shaped to conform to the smaller end of the valve, and a spring-pressed, flexibly mounted thrust bearing receiving and acting upon the larger diameter of the valve and serving to seat its smaller diameter, and means to restrain said thrust bearing from rotating with the valve.

9. A valve of the character described, having a valve seat, and a plug-like valve having its opposite ends of different diameter, each of the ends curved and the seat being curved to conform to the curvature of the smaller end of the valve, and a spring-pressed, flexibly mounted thrust bearing receiving and acting upon the larger diameter of the valve and serving to seat its smaller diameter.

10. A valve of the character described, having a valve seat, a plug-like valve having its opposite ends of different diameter and curved, the seat being shaped to conform to the smaller end of the valve, and a spring-pressed flexibly mounted, non-rotating bearing acting upon the larger end of the valve and serving as a thrust bearing and flexibly seating the smaller end of the valve.

11. A valve of the character described, having a valve seat, a plug-like valve having its opposite ends of different diameter and curved and the seat being shaped to conform to the smaller end of the valve, and a normally yielding thrust bearing receiving and acting upon the larger diameter of the valve, the valve having a flexible fit on the seat and in its bearing and adapted to adjust itself to the seat and bearing whether the two are in alignment or not and to effect a tight closing of the valve under either circumstance.

In testimony whereof I have hereunto set my hand this 30th day of June, A. D. 1926.

FRANK W. EDWARDS.